(12) United States Patent
Prochazka et al.

(10) Patent No.: US 11,421,619 B2
(45) Date of Patent: *Aug. 23, 2022

(54) WEAR MONITORING FOR ELECTRICAL ACTUATORS

(71) Applicant: Garrett Transportation I Inc., Torrance, CA (US)

(72) Inventors: Martin Prochazka, Prague (CZ); David Hriadel, Prague (CZ); Matej Pčolka, Prague (CZ)

(73) Assignee: Garrett Transportation I Inc., Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/108,467

(22) Filed: Dec. 1, 2020

(65) Prior Publication Data
US 2022/0170426 A1 Jun. 2, 2022

(51) Int. Cl.
| F02D 41/22 | (2006.01) |
| F02M 35/10 | (2006.01) |
| F01N 13/10 | (2010.01) |
| F02M 26/02 | (2016.01) |
| G01M 13/00 | (2019.01) |
| F02M 26/13 | (2016.01) |
| F02B 37/18 | (2006.01) |
| F02B 37/02 | (2006.01) |

(52) U.S. Cl.
CPC ......... F02D 41/221 (2013.01); F01N 13/10 (2013.01); F02B 37/02 (2013.01); F02B 37/186 (2013.01); F02M 26/02 (2016.02); F02M 26/13 (2016.02); F02M 35/10157 (2013.01); F02M 35/10222 (2013.01); G01M 13/00 (2013.01)

(58) Field of Classification Search
CPC ...... F02D 41/221; F02M 26/02; F02M 26/05; F02M 26/13; F02M 35/10157; F02M 35/10222; F02B 37/02; F02B 37/16; F02B 37/164; F02B 37/18; F02B 37/183; F02B 37/186; F01N 13/10; G01M 13/00
USPC .............................. 60/605.2, 611, 602, 608
See application file for complete search history.

(56) References Cited

U.S. PATENT DOCUMENTS

| 6,637,205 B1 | 10/2003 | Ahmad et al. | |
| 6,687,601 B2 * | 2/2004 | Bale | F02M 26/48 |
| | | | 73/114.74 |
| 6,802,302 B1 * | 10/2004 | Li | F02M 26/49 |
| | | | 73/114.74 |

(Continued)

FOREIGN PATENT DOCUMENTS

| DE | 102012006532 A1 | 10/2013 |
| EP | 3489493 A1 | 5/2019 |

(Continued)

*Primary Examiner* — Shafiq Mian
(74) *Attorney, Agent, or Firm* — Seager, Tufte & Wickhem, LLP

(57) ABSTRACT

Methods and systems that monitor an actuator state of wear. One or more observations are made as to one or more extremum positions of the actuator to determine a reference extremum position when the actuator is not worn. As the actuator becomes worn, the difference between a present extremum position and the reference is used to monitor actuator wear. Actuator wear may be observed to identify or predict a need for maintenance or replacement, and/or may be used in determining health impacts of control system solutions.

20 Claims, 10 Drawing Sheets

(56) References Cited

U.S. PATENT DOCUMENTS

| | | | |
|---|---|---|---|
| 6,837,226 B2 * | 1/2005 | Wang | F02M 26/49 123/568.16 |
| 6,848,434 B2 * | 2/2005 | Li | F02M 26/49 60/605.2 |
| 7,064,508 B2 * | 6/2006 | Keefover | G05B 19/4062 318/432 |
| 7,065,966 B2 | 6/2006 | Kamada et al. | |
| 7,606,636 B2 * | 10/2009 | Dykstra | G05B 13/041 700/282 |
| 7,631,552 B2 * | 12/2009 | Keski-Hynnila | G01M 15/05 73/114.74 |
| 7,636,614 B2 * | 12/2009 | Dykstra | G05B 13/041 700/282 |
| 7,677,227 B2 * | 3/2010 | Sagisaka | F02D 41/221 60/611 |
| 7,721,529 B2 * | 5/2010 | Kesse | F01N 11/00 73/116.01 |
| 8,523,511 B2 | 9/2013 | Love et al. | |
| 9,206,735 B2 * | 12/2015 | Hadas | F02B 37/186 |
| 9,243,553 B2 | 1/2016 | Kokotovic et al. | |
| 9,528,456 B2 * | 12/2016 | Stubbs | F02D 41/221 |
| 9,726,035 B2 | 8/2017 | Ratke et al. | |
| 9,835,265 B2 * | 12/2017 | Kucera | F16K 37/0041 |
| 2007/0156363 A1 | 7/2007 | Stewart et al. | |
| 2009/0000298 A1 | 1/2009 | Barthelet | |
| 2011/0071966 A1 * | 3/2011 | Holley | G05B 23/0243 706/12 |
| 2014/0338307 A1 | 11/2014 | Kokotovic et al. | |
| 2015/0160661 A1 * | 6/2015 | Avian | F02B 37/186 700/289 |
| 2017/0370498 A1 * | 12/2017 | Kawamura | F02B 37/186 |
| 2018/0003103 A1 * | 1/2018 | Kawamura | F02B 37/186 |
| 2018/0030851 A1 * | 2/2018 | Emmons | G05B 23/0245 |
| 2018/0041156 A1 * | 2/2018 | Kawamura | H02P 7/02 |
| 2018/0066574 A1 * | 3/2018 | Kawamura | F02B 37/18 |
| 2018/0119626 A1 * | 5/2018 | Wightman | F02D 41/0007 |
| 2018/0274472 A1 * | 9/2018 | Nagar | F02D 41/221 |
| 2019/0093913 A1 | 3/2019 | Mikulica et al. | |
| 2019/0162130 A1 | 5/2019 | Matsumoto et al. | |
| 2019/0211851 A1 * | 7/2019 | Behera | F16K 37/0083 |
| 2019/0218988 A1 * | 7/2019 | Dudar | F02D 27/02 |
| 2020/0081410 A1 * | 3/2020 | Walker | G05B 19/406 |
| 2020/0333809 A1 * | 10/2020 | Ollander | F16K 37/005 |

FOREIGN PATENT DOCUMENTS

| | | |
|---|---|---|
| JP | 2017040245 A | 2/2017 |
| JP | 2017075545 A | 4/2017 |

* cited by examiner

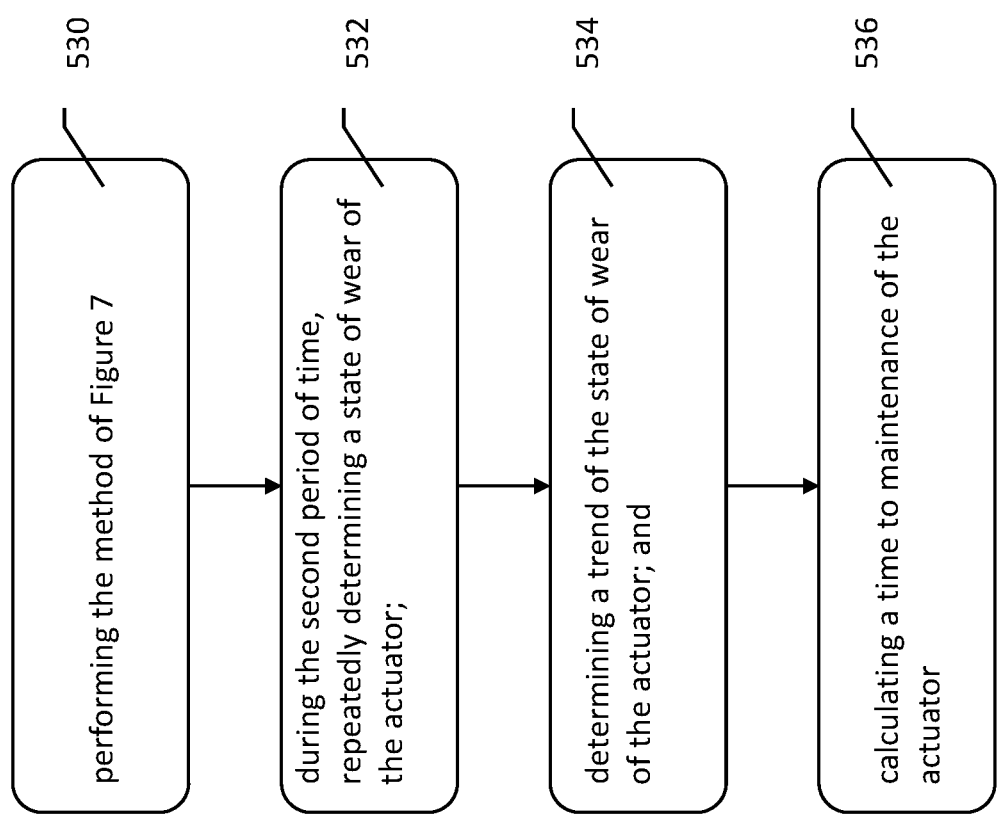

WEAR MONITORING FOR ELECTRICAL ACTUATORS

BACKGROUND

Various actuators in an engine and its associated control system are subject to wear. For example, the mechanical link between an electric motor and the effector of an actuator (such as to couple an electric motor to a valve link to operate the valve) is subject to mechanical and thermodynamic stresses. Wear of such actuators may not always manifest on the performance of the engine or vehicle it powers during the useful life of the actuator. However as wear progresses, the actuator cannot reach its end positions, causing loss of function which will manifest as loss of power. Alternatively, the mechanical link itself may be interrupted, meaning the actuator cannot exercise any control. Prior systems monitor actuator state of wear, generally, by simply counting how many times the actuator has been actuated, and comparing to a fixed number representing expected or rated life. Enhancements allowing the actual state of wear to be monitored and understood are desired.

OVERVIEW

The present inventors have recognized, among other things, that a problem to be solved is the need for new and/or alternative methods and systems for monitoring the state of wear of an actuator.

A first illustrative and non-limiting example takes the form of a method of monitoring an actuator comprising: during a first period of time, observing a plurality of activations of the actuator and calculating at least a first reference value for a first extremum position of the actuator from the observed plurality of activations; during a second period of time after the first period of time, observing an actuation of the actuator, calculating a second value for the first extremum position for the actuator, and comparing the second value to the reference value to calculate a first difference, and using the first difference to determine a state of wear of the actuator; and storing the state of wear of the actuator.

Another example takes the form of a method of controlling an engine system, the engine system having at least one actuator used in controlling operation of an engine, the method comprising: applying an optimization routine that integrates a health factor for the engine to control operation of the engine; performing the method of the first illustrative and non-limiting example to determine and store a state of wear of the actuator; and updating the health factor for the engine to account for the state of wear of the actuator.

Additionally or alternatively, the engine has an intake manifold and an exhaust manifold, and the engine system includes an exhaust gas recirculation (EGR) valve placed and adapted to allow exhaust gas from the exhaust manifold to recirculate to the intake manifold, and the at least one actuator is an actuator for the EGR valve.

Additionally or alternatively, the engine comprises an intake manifold and an exhaust manifold, and the engine system includes: a turbocharger having a compressor configured to compress air going to the intake manifold and a turbine configured to receive exhaust gas from the exhaust manifold and generate torque to drive the compressor; and a wastegate (WG) placed and adapted to allow exhaust gas from the engine to bypass the turbine, further wherein the at least one actuator is an actuator for the WG.

Additionally or alternatively, the engine comprises an intake manifold, and the engine system includes: a compressor configured to compress air going to the intake manifold; and a recirculation valve (RCV) adapted to selectively recirculate compressed air at the intake manifold to a position upstream of the compressor; further wherein the at least one actuator is an actuator for the RCV.

Additionally or alternatively, the engine system comprises a throttle at least partly controlling air flow to the engine, further wherein the at least one actuator is an actuator for the throttle.

Additionally or alternatively, the method may further comprise comparing the state of wear of the actuator to a maintenance threshold and, if the maintenance threshold is exceeded, declaring a need for maintenance of the actuator.

Additionally or alternatively, the method may further comprise during the second period of time, repeatedly determining a state of wear of the actuator; determining a trend of the state of wear of the actuator; and calculating a time to maintenance of the actuator.

Additionally or alternatively, the method may further comprise communicating the state of wear of the actuator to a centralized database.

A second illustrative and non-limiting example takes the form of a configurable controller for controlling a physical plant having associated therewith a plurality of actuators for controlling operation of the physical plant and a plurality of sensors for observing a plurality of characteristics of the physical plant operations, the configurable controller comprising: a state observer configured to capture the current state of the physical plant by communication with the plurality of sensors; and an optimizer configured to optimize behavior of the physical plant using at least the actuators; wherein the state observer is configured to determine a state of wear of a selected one of the actuators by: during a first period of time, observing a plurality of activations of the actuator and calculating at least a first reference value for a first extremum position of the actuator from the observed plurality of activations; and during a second period of time after the first period of time, observing an actuation of the actuator, calculating a second value for the first extremum position for the actuator, and comparing the second value to the reference value to calculate a first difference, and using the first difference to determine a state of wear of the actuator.

Additionally or alternatively, the optimizer is operable using at least one first term associated with optimized performance of the physical plant based on the current state of the physical plant, and at least one second term associated with health degradation of one or more components of the physical plant, and the optimizer operates to direct use of parameters in the actuators to minimize the sum of the first and second terms, wherein the state of wear of the actuator is incorporated into the at least one second term.

A third illustrative and non-limiting example takes the form of a configurable controller for controlling an engine system including an engine having an intake manifold and an exhaust manifold, the engine system having associated therewith an actuator for controlling operation of a component of the engine system and a sensor for sensing position of the actuator, the configurable controller comprising: a state observer configured to capture the current state of the physical plant by communication with at least the sensor; and an optimizer configured to optimize behavior of the physical plant using at least the actuator; wherein the state observer is configured to determine a state of wear of the actuator by: during a first period of time, observing a plurality of activations of the actuator and calculating at least a first reference value for a first extremum position of the actuator from the observed plurality of activations; and during a second period of time after the first period of time, observing an actuation of the actuator, calculating a second value for the first extremum position for the actuator, comparing the second value to the reference value to calculate a first difference, and using the first difference to determine a state of wear of the actuator.

Additionally or alternatively, the optimizer is configured to: incorporate the state of wear of the actuator into an optimization routine that identifies control parameters for operation of the engine; perform the optimization routine to generate a control solution; and issue control signals to the engine system, including the actuator, to implement the control solution.

Additionally or alternatively, the controller may be further configured to: record the state of wear of the actuator during the second period of time a plurality of times in response to a plurality of iterations; extrapolate a future state of wear of the actuator; and determine a time to maintenance for the actuator.

Additionally or alternatively, the controller may be further configured to: compare the state of wear of the actuator during the second period of time to a wear threshold; and if the wear threshold is met by the state of wear of the actuator, generate an alert calling for maintenance of the actuator.

Additionally or alternatively, the controller may be further configured to communicate the state of wear of the actuator to a centralized database.

Additionally or alternatively, the engine system includes an exhaust gas recirculation (EGR) valve placed and adapted to allow exhaust gas from the exhaust manifold to recirculate to the intake manifold, and the actuator is configured to control the EGR valve.

Additionally or alternatively, the engine system includes: a turbocharger having a compressor configured to compress air going to the intake manifold and a turbine configured to receive exhaust gas from the exhaust manifold and generate torque to drive the compressor; and a wastegate (WG) placed and adapted to allow exhaust gas from the engine to bypass the turbine, further wherein the actuator is configured to control the WG.

Additionally or alternatively, the engine system includes: a compressor configured to compress air going to the intake manifold; and a recirculation valve (RCV) adapted to selectively recirculate compressed air at the intake manifold to a position upstream of the compressor; further wherein the actuator is configured to control the RCV.

Additionally or alternatively, the engine system comprises a throttle at least partly controlling air flow to the intake manifold, further wherein the actuator is configured to control the throttle.

This overview is intended to introduce the subject matter of the present application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 6-10 show illustrative methods for monitoring an actuator or controlling an engine.

DETAILED DESCRIPTION

Figure 1:
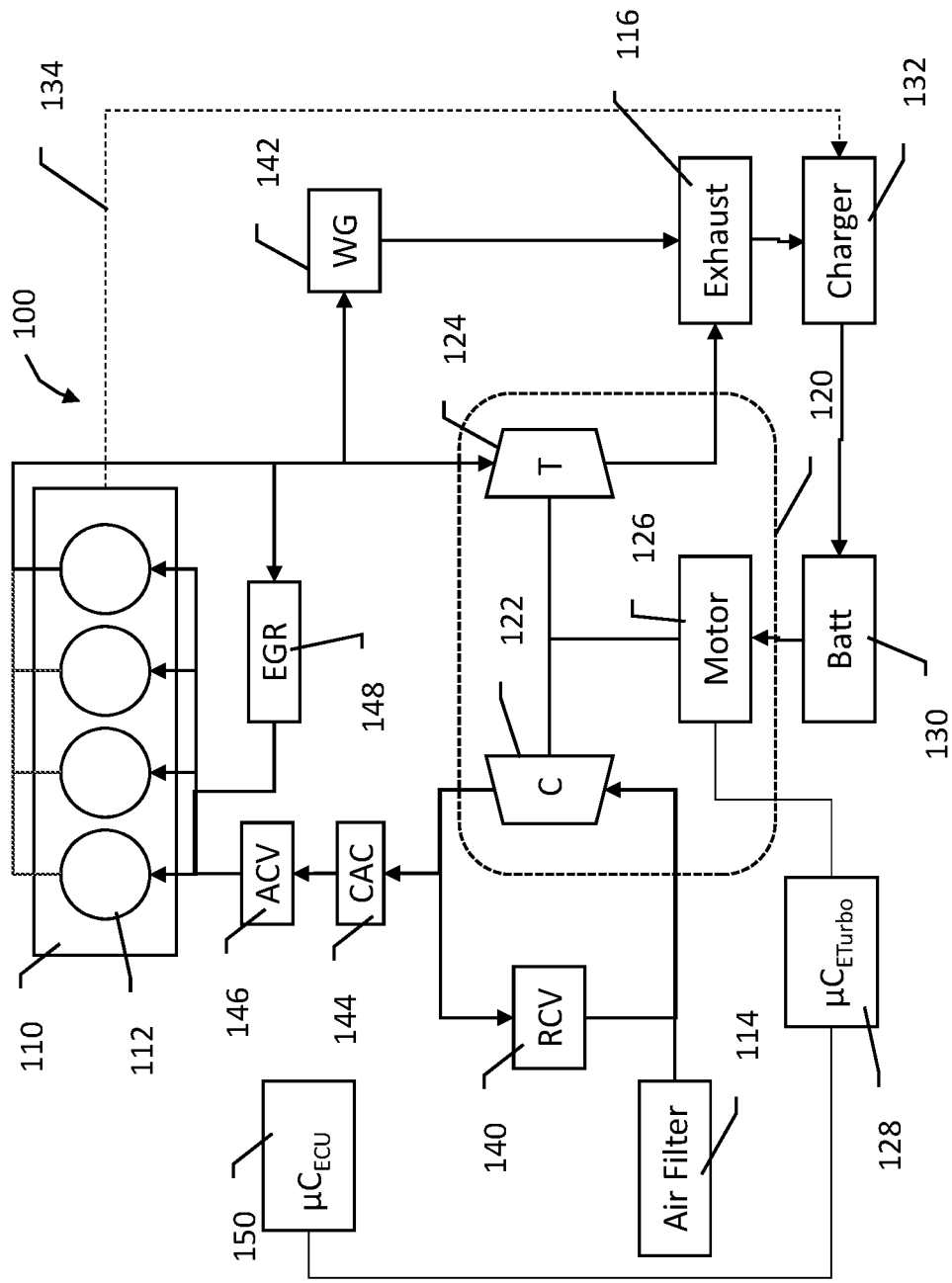
FIG. 1 shows an illustrative engine with a turbocharger.

FIG. 1 shows an illustrative engine with a turbocharger. The overall system is shown at 100, with an engine at 110 having a plurality of cylinders 112, with an intake manifold for receiving incoming air flow, and an exhaust manifold for release of exhaust gas after combustion. Air going into the engine is received through an air filter 114 and flows to a compressor 122, which compresses the air to an increased pressure to improve power and efficiency of the engine. A charge air cooler (CAC) is shown at 144 for reducing the temperature of the air coming out of the compressor 122. The compressed and cooled air is fed to the intake manifold of the engine 110 through a throttle 146 (indicated as an adjustable choke valve (ACV)). A recirculation valve (RCV) 140 can be provided to cycle compressed air downstream of the compressor 122 back to its input, and may be opened for example when the throttle is closed to prevent compressor surge, as needed. The compressor 122 is shown as part of an optional turbocharger 120, which also includes a turbine 124 placed in the exhaust gas airstream coming out of the engine 110. The turbine 124 uses the exhaust gas pressure to spin the compressor 122. A wastegate (WG) 142 is provided to bypass the turbine 124 by directing exhaust gases to the exhaust passage 116, allowing regulation of the turbine 124 (and hence compressor 122) speed. An exhaust gas recirculation (EGR) valve is also shown at 148, which controllably recirculates exhaust gas back to the intake manifold of the engine 110. The various valves and components shown may have a variety of actuators to control positions thereof, and are used according to well-known methods to control and enhance various operating characteristics including efficiency, power, and/or environmental factors such as exhaust gas composition.

In the example shown, an E-Turbo is included to augment operation of the turbocharger 120. A motor 126 is mechanically linked to the drive shaft between the turbine 124 and the compressor 122. At low engine speeds, and without the E-Turbo, when a demand for increased power is received, the compressor 122 cannot provide the needed extra boost pressure. Under such conditions, air pressure at the intake manifold will remain relatively low until the engine speed increases, delaying response to the requested increase in power, a phenomenon known as turbocharger lag. With an E-Turbo design, when a demand for power is received with the engine operating at a relatively low speed, the motor 126 supplies added power to the compressor 122 to increase intake manifold air pressure, reducing lag of the system. The motor 126 may be powered by a dedicated battery 130. In the example shown, the battery 130 is rechargeable, and a charger 132 is configured to receive power from the exhaust gas airstream to recharge the battery 130. In other examples the battery 130 may instead be charged from the system alternator, which may receive power directly from the engine drivetrain, as indicated by dashed line 134.

Engine control unit (ECU) is provided at 150 and controls overall operations via various connections (not shown) to actuators, valves, sensors and other components throughout the system. In the example shown, a second controller is provided at 128 as an E-Turbo controller, which is electrically connected to the ECU. Other power and control topologies for the motor 126 may be used. The ECU 150 may be operably linked to other components of the control architecture described below in reference to FIG. 6, and implements control solutions generated by the control architecture to control the various actuators and valves that are present in the system, as well as the E-Turbo controller 128 (if included).

The E-Turbo is not necessary to the design and is shown for illustrative purposes. Moreover, a turbocharger 120 as shown may be omitted entirely, or may be replaced with a supercharger (using drivetrain power to control a compressor 122, which would still be included in a supercharger configuration, but omitting at least the turbine 124), or by a compressor 122 powered entirely electrically, if desired.

Any actuator, any subset of actuators, or all actuators, throughout the system may be monitored and actuator state of wear or health may be characterized. For example, the throttle (not shown, but following the CAC 144), a variable intake compressor (VIC), if such a compressor is used, the RCV 140 and/or the WG 142 are each associated with actuators that may be characterized. Some examples may include a variable geometry turbine as element 124, which may itself be associated with another actuator the wear and/or health of which may be characterized. A valve or other component driven by an actuator may also be characterized and its state of wear determined.

Figure 2:
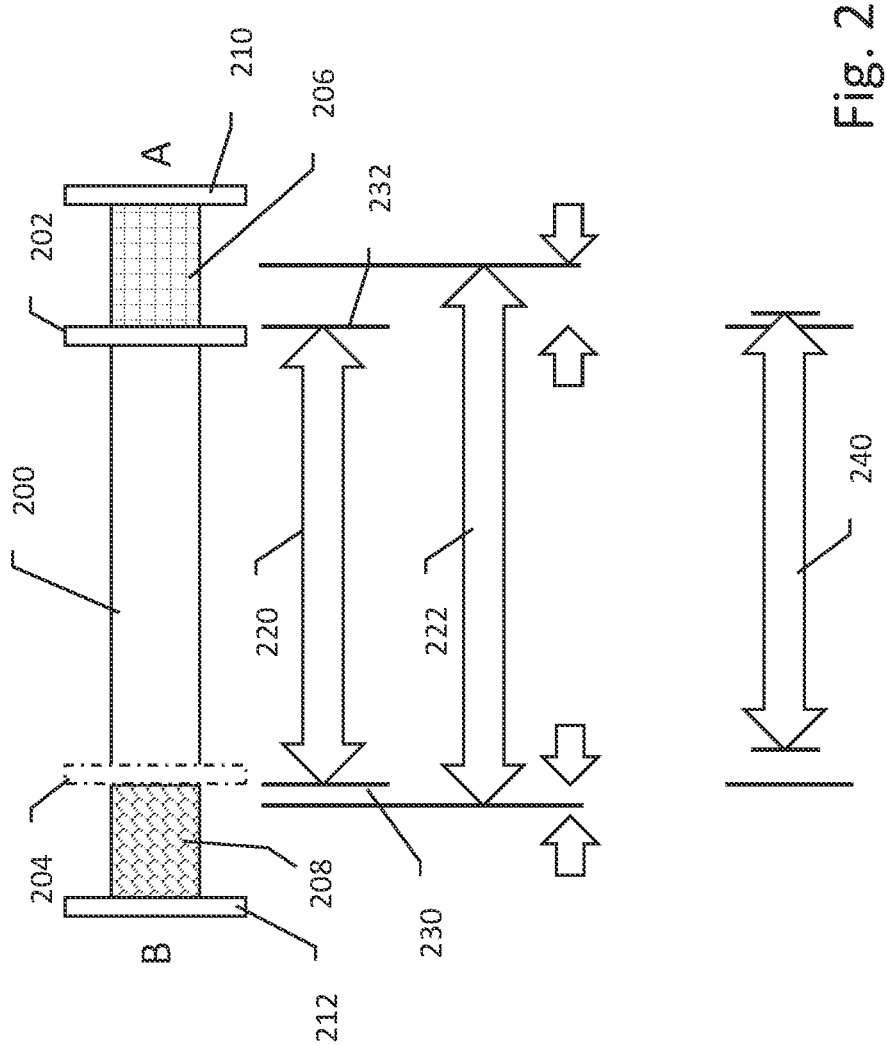
FIG. 2 illustrates actuator range of motion and wear over time.

FIG. 2 illustrates actuator range of motion and wear over time. An actuator is shown in highly simplified form at 200, with a moving actuator component at 202, shown toward a first end of its dynamic range 210, and in phantom at 204 toward a second end of its dynamic range, 212. The positions shown at 202 and 204 may be first and second extremum positions, respectively, for the moving actuator component 202, or for the actuated component, depending on how one wishes to describe it. When new, the actuator may be fully engaged when positioned at the location shown by the moving actuator component at 202, and fully disengaged when positioned at the location shown in phantom at 204. As an example, if the actuator drives a valve, or an effector, when the actuator is at position 202 it cannot move farther in the direction of end stop 210 due to the valve or effector reaching a physical stop. The position at which the actuator cannot move farther in a given direction is the extremum position for the actuator in the given direction. As the actuator and/or the component it moves wears over time, its end position at the engaged and/or disengaged positions can change, and extra dynamic range is provided for as shown at 206, 208, allowing for adjustment over time to maintain function.

The actuator 200 may be monitored by a sensor that monitors the position of the moving actuator component 202. Thus, for example, a force sensor may be provided to determine that the force applied by the actuator increases above a force limit, indicating full engagement or disengagement. When moving toward the engaged position, the force sensor is used to provide feedback that stops actuation when full engagement occurs, causing the moving actuator component 202 to stop. The end position of full engagement, toward direction A, or full disengagement, toward direction B, can thus be monitored. When new, the useful dynamic range can thus be determined as shown at 220, and the positions for full engagement and disengagement can be recorded.

Figure 3:
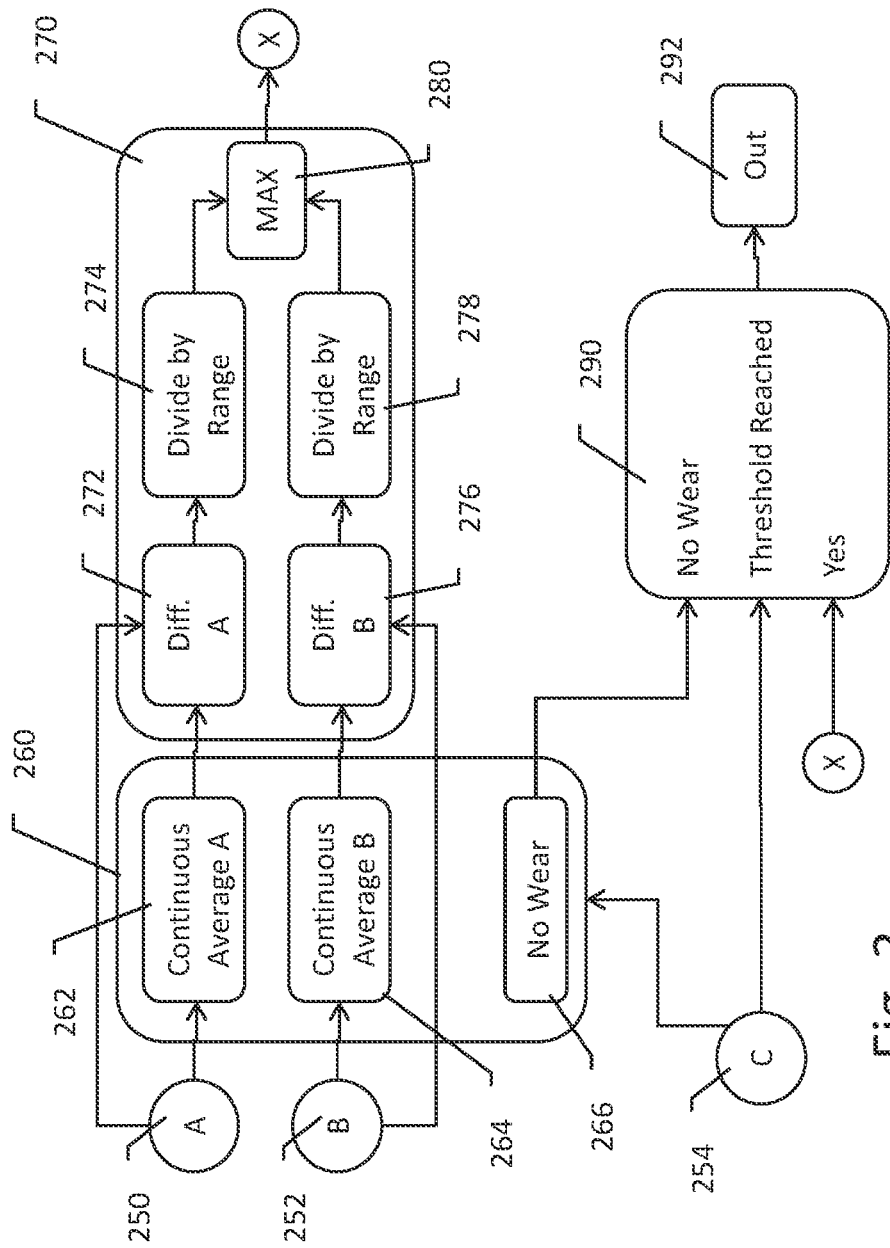
FIG. 3 shows an illustrative method of actuator wear monitoring.

In some examples, as the components age, whether the driven component (an effector or valve for example) or the actuator, a change in end position at each of the full engagement direction A and full disengagement direction B is monitored. That is the change from the "new" useful dynamic range 220 to a later useful dynamic range 222 is sensed and tracked. The end positions are measured as indicated at 230 and 232. These measured end positions 230, 232 are then used in analysis as shown in FIG. 3. It may be noted that the measured end positions 230, 232 may go in the other direction as well, or may each shift in one direction, in other examples. For example, if a valve becomes fouled over time, it may not be possible for the actuator to reach the full dynamic range shown at 220, and a lesser dynamic range 240 may occur instead; as shown at 240, there may be different shifts at each end of the range. The methods herein may be used to characterize such shifts as well to determine a state of wear or health of the actuator itself or the component it drives.

FIG. 3 shows an illustrative method of actuator wear monitoring. Positions A and B, reflecting sensed end points of actuator movement, are used as input values at 250, 252 to the method. During a first stage of analysis 260, continuous averages for each of the positions A, B, are calculated at 262, 264, respectively. This first stage of analysis 260 may be considered a "learning" stage, where the actual positions used in practice while the actuator is relatively new are determined. The first stage 260 may be treated as a "no wear" stage of the analysis, as indicated at 266. In an alternative formulation, nominal values may be entered and used to define positions A, B, allowing the first stage of the analysis to be omitted. After positions A, B are recorded in the learning stage or first stage, the continuous averages are then fixed, for example, after a certain passage of time or quantity of drive cycles.

A second stage of analysis is also shown at 270. In the second stage 270, the continuous averages of each of A and B are compared to the current measurement of positions A and B, as shown at 272 and 276, respectively. The absolute value of the resulting difference can be divided by the range of motion for the actuator, as indicated at 274, 278, and the second stage then determines the maximum 280 of the two results from blocks 274, 278. The range division steps are optional and may be omitted in some examples. In some examples, the divisions at 274, 278 are provided for purposes of normalizing the results to an interval between zero (0) and one (1). For example, an expected total range of change for the monitored variables, A and B may be used. In other examples, the dividing step can be omitted and the output value X is reflective of absolute change relative to the continuous averages from first stage 260. In some examples, a more granular approach to monitoring a given actuator may omit the step at block 280, and may report values for each of the A and B positions as outputs, allowing monitoring of health of the actuator relative to each of its endpoints independent of the other of the end points.

An output selector stage is shown at 290. An output is generated at 292 by determining whether to output a "no wear" indicator, or an indicator of the state of wear, X, which was output by the second stage 270. A factor, C 254, is used to determine which output to issue at 292.

In an example, Factor C 254 is an indicator of how much the actuator has been used, determined based on clock or calendar time, time in operation/use, or number of actuations. For example, for an actuator rated for 10,000 actuations, or for 2 years of use, or 4 years of calendar time (or any other suitable rating) a threshold of 1% to 5% of rated use can be used (or some other fraction, anywhere from 0.1% to 99%, as desired). In another example, the number of A, B signal changes issued to the actuator may be monitored, or the number of times that the end-position learning stage has been executed may be tracked. Most examples may use a relatively low percentage of rated use in Factor C 254, such that the first stage or learning stage of the analysis is relatively brief in comparison to the total expected life of the actuator. As noted, in an alternative approach, the first stage of analysis may be omitted, and nominal values may be entered and fixed.

When the end of the learning stage or first period of time occurs, Factor C may switch from a "No Wear" indicator to a "Used" indicator. Prior to reaching this threshold, C may indicate "No Wear," and the output at 292 indicates that the actuator or other component is not worn. When C switches to "Used", this can be communicated to block 260 and the continuous averages at 262 and 264 are fixed and no longer updated. Alternatively, the learning stage block 260 may issue a communication toggling Factor C from "No Wear" to "Used". In addition, block 290 switches from reporting no wear at the output 292 to instead report the calculated value X at the output 292. The interval of operation during which factor C reflects the "No Wear" status may be considered a "first period of time", and the interval of operation in which factor C reflects the "Used" status may be considered a "second period of time," wherein the switch from the first period of time to the second period of time may occur based on any of calendar duration, use duration, or number of actuations, for example, or any other suitable factor.

Figure 4:
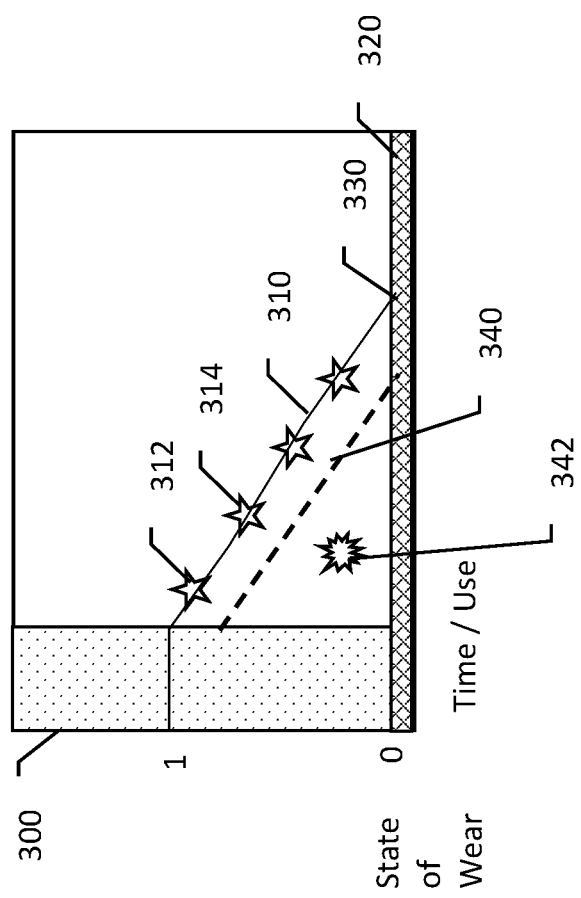
FIGS. 4-5 show methods of using an actuator wear calculation.
Figure 5:
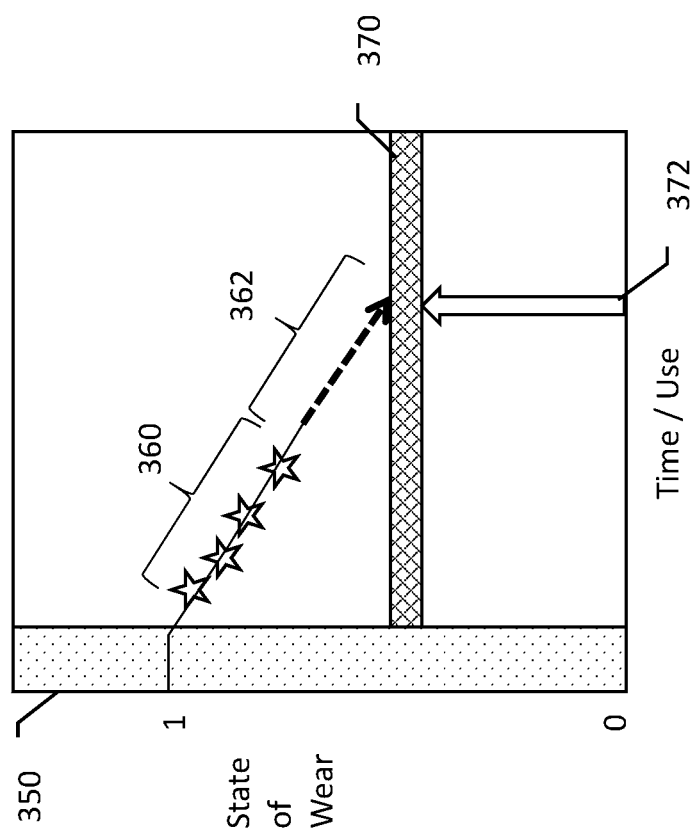

FIGS. 4-5 show graphically how these calculations in FIG. 3 can operate and be used over time. In FIG. 4, the actuator state of wear is shown on the Y-axis, and the quantity of time or usage is shown on the X-axis. When the actuator is new, during the interval shown at 300, the output state of wear is "New," illustrated numerically as "1", as in this example the state of wear is normalized to an interval between 0 and 1. Upon reaching a certain quantity of use, that is, when factor C switches from "No Wear" to "Used," the system begins calculating the health status, X, using methods as described above relative to FIG. 3. A line 310 is shown illustratively to reflect the health status over time, with individual measurements illustrated at 312, 314. It should be understood that there may be tens, hundreds, thousands or more individual measurements. The trendline shown is both smoothed and linear. It may be that the individual measurements vary above and below the trendline. In addition, the trend line may not be a linear trendline, and may vary in slope over time.

In the example shown, when the value for X reaches a selected value, here shown as intersecting at 330 with a line at 320 that corresponds to X=0, the actuator is declared to be at its end of useful life, and an end of useful life alert is generated. Such an alert may occur before actual failure of the actuator, allowing preventive maintenance before failure, which may also prevent damage or reduced operation due to actual failure, for example. In other examples, the line at 320 may not be at X=0, and may be set above X=0 to provide an alert prior to reaching X=0 so that replacement or other maintenance may be scheduled ahead of time. In another example, multiple alerts may be generated as the value of X crosses selected points, such as issuing alerts when X=0.5, when X=0.25, and again when X=0.1. More or fewer alerts, at these or different values of X, may be used.

In some examples, the system may be configured to alert a user in the event a measured state of wear does not match expected degradation. For example, an alert line can be provided as shown at 340 to alert the user in the event that a measurement, such as that reflected at 342, does not correlate to either the expected degradation curve, or mismatches other measurements. For example, line 340 may be calculated statistically to identify an outlier. For example, line 340 can be determined by calculating a trend or downward slope of line 310, determining a standard deviation for measurements 312, 314 along the line, multiplying the standard deviation by a selected factor (3 or 4, for example) to calculate a deviation threshold, and subtracting the deviation threshold from line 310. In some examples, a measurement as shown at 342 may be determined to be an outlier, raising an alert or trouble code in the system relating to the sensor that tracks actuator position; repeated measurements below line 340 may be used to generate still further alerts, indicating unexpected failure of the actuator or a sensor.

FIG. 5 shows another example. Here, again, before factor C switches from "No Wear," region 350 simply shows the state of wear as being at an upper limit, again normalized to the range of 0 to 1. When factor C switches to "Worn," the calculated state of wear, X in FIG. 3, is reflected on the graph. A number of measurements are taken over time, generating a measured trend at 360. In this example, the measured trend is extrapolated at 362 to a point in time, indicated at 372, when an alert limit 370 is expected to be reached. In this example, the alert limit 370 is elevated above the point where the state of wear equals 0, providing the alert before likely failure. Such extrapolation can be used to enable scheduled maintenance for the actuator, avoiding potential unexpected downtime.

For each of FIGS. 4-5, the "No Wear" regions 300, 350 may be longer or shorter than that illustrated. It should be understood that neither figure is intended to be drawn to scale.

In some examples, the data shown in FIGS. 4-5 may also be communicated to a central database. For example, with a fleet of vehicles, a central database may receive information from each vehicle in the fleet to gather a broader picture fleet health. Such a database may be used to identify outlier vehicles or vehicle components. For example, if most vehicles in a fleet show a degradation trend as shown in FIG. 5 with slope 360, vehicles that show a different trend may be flagged for further analysis and/or early maintenance or other intervention.

Figure 6:
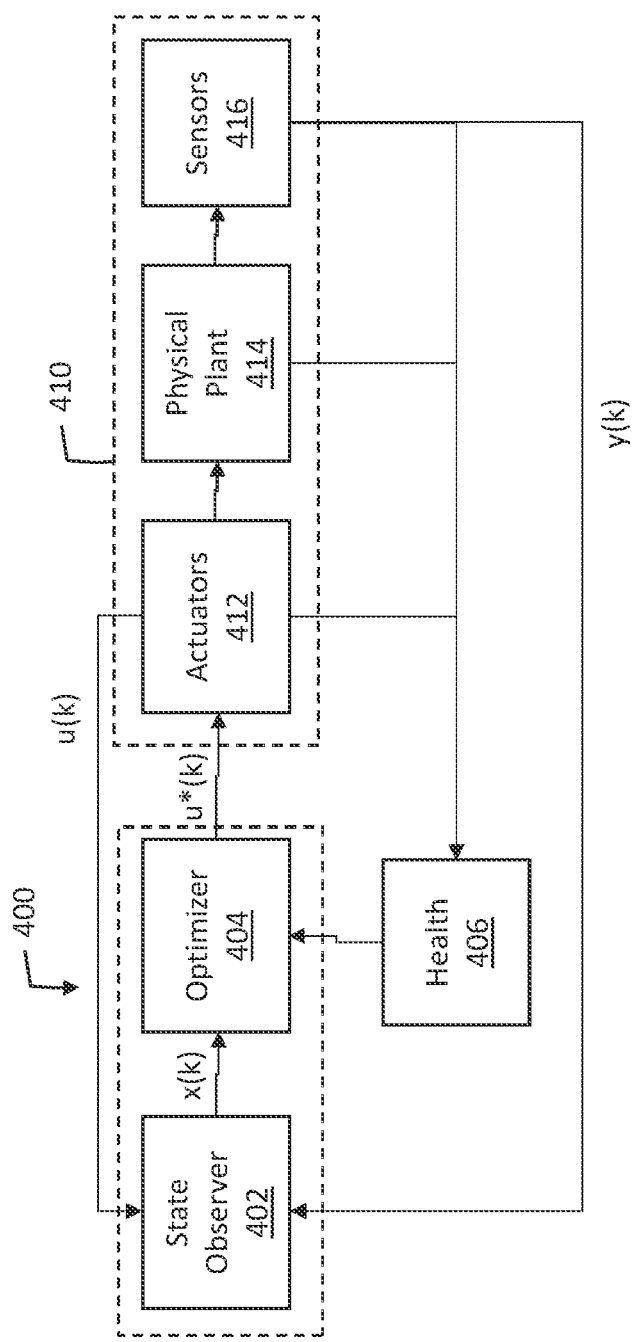

FIG. 6 illustrates a control architecture for a physical plant. A control apparatus is shown at 400 and includes a state observer 402 and an optimizer 404. The state observer 402 provides a set of current state variables x(k) to the optimizer 404, which calculates a control solution and generates control outputs.

The controlled system is shown at 410, and may be, for example, a system as shown in FIG. 1. The optimizer 404 calculates a solution for process parameters that can be applied to a set of actuators 412, which in turn control operation of the physical plant 414. The set of actuators 412 may control, for example and without limitation, fuel or other injectors, variable nozzle turbine position, throttle valve position (including an associated actuator), engine brake, after-treatment (including exhaust) componentry, exhaust gas recirculation (EGR) including the EGR valve and its actuator, turbocharger, an electric motor, an actuator to connect an electric motor to components on which it acts (such as to connect an electric motor to the shaft of a turbocharger), VIC, the waste gate (WG) actuator position, position of the recirculation valve actuator, and combinations thereof.

The controlled system 410 may be, for example and without limitation, an internal combustion engine, whether diesel or gasoline, or a subsystem thereof, such as a turbocharger, the system airpath as a whole, catalysts, etc. The present innovations may also be used more broadly in other systems outside of the engine or vehicle context, including, for example and without limitation, the management of clean room and/or more general ventilation systems, boilers, power plants, furnaces, and/or factory/manufacturing equipment and lines of such equipment, including for example an extruder or a fixture in a manufacturing line, where the concepts may be applied to a variety of actuators in such products, systems and installations.

A plurality of sensors 416 are provided. Sensors 416 may include, for example, and without limitation, sensors detecting manifold absolute pressure (MAP), mass air flow (MAF), EGR flow, turbo speed, NOx, engine speed, fuel quantity, boost pressure, etc. Additional monitored parameters may include, for example, torque output of the electric motor of an electric turbocharger, waste gate (WG) normalized opening, recirculation valve (RCV) normalized opening, and/or a variable geometry compressor configuration. Some sensors may sense actuator position, such as an actuator controlling a valve, an effector, or providing connection between an electric motor and the shaft of a turbocharger. Such sensors may be configured to sample the underlying parameter being sensed and provide the result of such samples to the state observer 402.

The state observer 402 may record the underlying sensed parameters, as well as actuator positions, over time to provide history of the system operation. The state observer 402 may also receive information about system health from a health monitor, shown as block 406. The state observer 402 may use data from the health monitor 406 to enhance the accuracy of current state observations. In some cases, system behavior may change based on the extent of wear and/or ageing of components and actuators, and so the state observer 402 may provide inputs related to health and changes in behavior to the optimizer 404. For example, a battery state of health can degrade over time, affecting operational parameters such as internal resistance or thermal conductivity. By updating battery health details in the state observer, and providing this information into the optimizer, a battery related parameter such as state of charge may be estimated more accurately than would otherwise be the case. For example, if state of charge of a battery is estimated using known load conditions, updating the internal resistance of the battery will affect the state of charge estimate (which may seek to estimate the zero output voltage of the battery by treating the battery as a circuit element with known internal resistance).

The state observer 402 and optimizer 404 may be, for example, implemented in a microcontroller configured to operate on a set of stored instructions for performing a state observation and optimization routine. In another example, an application specific integrated circuit (ASIC) may provide state observer functions, which can include the capture or accumulation of data from the actuators 412 and/or sensors 416, which in turn may be read periodically by a microcontroller configured with stored instruction sets for performing a control and/or optimization calculation using, for example, model predictive control (MPC) cost functions, linear quadratic regulator (LQR) control, proportional integral derivative (PID) control, or other control algorithms. The optimizer 404 may be integrated into, or provided separately from, an on-board diagnostics system (not shown) that can be used to record diagnostic variables and present them, as needed to the user or to store for later analysis, both of which may additionally be integrated, if desired, into the overall vehicle processing unit.

The output of the analysis is used to control the actuators 412 to operate the system 410 in a manner to minimize the distance of operating parameters from one or more target output values for the controllable outputs or physical plant operating characteristics. For example, the targets may be any of target turbocharger speed, target boost pressure, target pressure difference over the compressor, target mass flow or combinations thereof. For example, with MPC functions, the distance of observed status to target or reference values is minimized within a prediction horizon, thus optimizing performance. As an example, a traditional MPC cost function formation may be as shown in Equation 1:

$$J_{MPC} = \min \sum_{k=1}^{P} \|y_{r,k} - y_k\|_{W_1} + \|u_{d,k} - u_k\|_{W_2'} \quad \text{[Eq. 1]}$$

Where $u_{d,k}$ corresponds to the desired profile for the manipulated variable, $u_k$ stands for the manipulated variable, k denotes discrete time instance, and P stands for the prediction horizon of the predictive controller. In this example, $y_{r,k}$ represents output reference values, and $y_k$ represents predicted values provided according to mathematical modelling of the physical plant to be controlled during the relevant time horizon, while and $W_1$ and $W_2$ specify weighting terms. The traditional MPC cost function is minimized in operation in order to provide optimal control to the physical plant. Such a process may be performed by the optimizer 404.

In another example, a PID controller can be used to account for each of proportional, integral, and derivative differences from a target operating point. The proportional difference may indicate current state, integral difference may identify a process shift over time, and derivative difference may indicate the direction of changes in operation. With PID control, a proportional difference is minimized while monitoring to ensure that the integral and derivative differences do not indicate changing performance which may, after further iterations, cause the proportional difference to increase. The control parameters output to the actuators 412 are, for a PID controller, adjusted to reduce or minimize the distance of actual performance from one or more targets on an iterative basis. The optimizer 404 may use PID control instead of MPC, for example. Other control algorithms, such as LQR control, may be used instead, if desired.

The system in FIG. 6 further includes a separate health monitor block at 406, configured to receive information from the sensors 416, physical plant 414, and/or actuators 412. The information obtained by the health monitor block 406 may include, for example and without limitation, an indication of current state (for example, whether and to what extent a valve is open), applied control signals, etc.

In some examples, the health monitor block 406 is used to perform methods as shown above in any of FIGS. 3-5. In other examples, the health monitor 406 may be integrated into the state observer 402. For such examples, the state observer 402 may be configured to perform the methods shown and described above in FIGS. 3-5 to monitor, determine and/or predict the state of wear of any of the actuators, valves or other components. In some examples, an actuator or actuator controller may store data related to its own health by obtaining data from the actuator's associated sensor and by tracking its own use, and then performing the methods as shown above in any of FIGS. 3-5.

For example, the state observer 402 and/or health monitor 406, or an actuator controller, may record the state of wear of the actuators, valves or other components over time. In some examples, the state observer 402 and/or health monitor 406 may compare the state of wear of one or more actuators or valves to one or more maintenance thresholds or expected values, to determine whether the state of wear of the monitored component has crossed a threshold calling for any of long term, near term, or immediate maintenance to prevent failure of the monitored component.

In some examples the state observer 402 and/or health monitor 406, or an actuator controller, may determine a trend of the state of wear of the monitored component to predict future need for maintenance or potential failure thereof. For example, the state of wear may be stored as a variable between zero (0) and one (1), with one representing a new actuator that has not been subject to wear, and zero representing a state of wear in which the monitored component has been determined to be at or near end of useful life. This may be similar to the methods described above relative to FIG. 5.

In some examples, the state observer and/or health monitor 406 may communicate a present or projected state of wear out from the system, such as via cellular or internet communication, to a central server that monitors health across a fleet of vehicles or other installations. In addition to, or as an alternative to, use in determining or projecting a need for maintenance, the state of wear of any such component may be used in the optimization routine.

Block 406 is shown for illustrative purposes but may be understood as being integrated into the optimizer 404. The operations of blocks 402, 404 and 406 may be implemented in a microcontroller configured to operate on a set of stored instructions for performing a state observation, health management and optimization routine. In another example, an application specific integrated circuit (ASIC) may provide state observer 402 and/or health monitor block 406 functions, which can include the capture or accumulation of data from the actuators 412 and/or sensors 416, which in turn may be read periodically (or in response to predefined events) by a microcontroller configured with stored instruction sets for performing an optimization calculation using, for example, MPC cost functions, LQR control, PID control, or other control approaches. Various applications specific to individual components are described in U.S. patent application Ser. No. 17/008,076, titled HEALTH CONSCIOUS CONTROLLER.

Health factors, including actuator state of wear, may be incorporated in the control scheme. In a first approach, an MPC method is used for optimizing performance after accounting for health impacts, which may be incorporated as shown here in Equation 2:

$$\min J_{HCMPC,1} = \min(w_1 J_{MPC,T} - w_2 \Sigma HI_k) \qquad [\text{Eq. 2}]$$

Where $J_{MPC,T}$ represents the traditional MPC criterion for the physical plant from Equation 1, excluding health indicators, $HI_k$ represents a health indicator which decreases as health degrades, and $w_1$ and $w_2$ are weighting factors determining relative performance and health indicator weights. As an example, $HI_k$ may represent a state of wear of an actuator and/or a predicted impact to the state of wear of an actuator due to actions to be undertaken in response to the control solution within the prediction horizon. The state of wear may be updated over time and implemented in the cost function, by using the method shown in FIG. 3. As the health degrades over time, the optimization calculation may change.

To monitor for impact to health of each actuation, the U.S. patent application Ser. No. 17/008,076, titled HEALTH CONSCIOUS CONTROLLER suggests using the quantity of actuations as representing the impact of optimization steps. Thus, each movement of an actuator set to occur in the time horizon of the actuation calculation would be counted more or less equally. One enhancement in the present case is to substitute an estimation of the impact of each actuation, using trend data generated using the method of FIG. 5. Thus, for example, during the "second time period" noted in FIG. 5, a plurality of calculations are performed, generating a calculated state of wear as the monitored component is actuated. Using a linear extrapolation, best fit, or a polynomial, the impact to the state of wear of the actuator of future actuations can be calculated, and this projected health impact of continue actuations may be integrated into the health optimization calculation.

$HI_k$ may be a composite of health indicators for a plurality of component health factors, or may be a stand-alone indicator for a single component. In some examples, more than one $HI_k$ factor may be included for each of several health impacts, such as by having a first term for WG, a second term for EGR valve, and a third term for a change in compressor speed, for example, each with a separate weighting factor. In other examples, Equation 2 may be modified to account for multiple health factors by nesting a summation inside the $HI_k$ term to account for all considered health impacts. Individual health impacts within $HI_k$ term may be further weighted, as by having a separate weighting for compressor impacts relative to EGR impacts, since replacing an EGR is potentially cheaper and simpler than replacing the compressor.

An alternative formulation is shown in Equation 3:

$$\min J_{HCMPC,2} = \min(w_1 J_{MPC,T} + w_2 \Sigma \Delta HI_k) \qquad [\text{Eq. 3}]$$

Where $\Delta HI_k = HI_{k-1} - HI_k$ is an indication of the health indicator degradation that results from steps that occur in the time horizon of the calculation. Using WG as the example, the delta from time instance k−1 to time instance k may reflect a change in the remaining fraction of actuation cycles for which the WG is rated, or it may reflect a projected change in the state of wear of the WG that future actuation cycles is calculated to cause. The other terms are as in Equation 2. Equation 2 thus represents a health state maximizing MPC approach, while Equation 3 represents a health degradation minimizing MPC approach.

A controlled health degradation approach may instead use a slack variable to manage health indicator degradation. Equation 4 is illustrative:

$$\min J_{HCMPC,3} = \min(w_1 J_{MPC,T} + w_2 \Sigma s_{HI,k}) \qquad [\text{Eq. 4}]$$

Here, the MPC criterion (excluding health factors) can be calculated alongside a slack variable, and the weighted sum minimized. The slack variable can be determined with Equation 5:

$$s_{HI,k} = \Delta HI_k - \overline{\Delta HI}_k \qquad [\text{Eq. 5}]$$

Where $\overline{\Delta HI}_k$ is a maximum allowed health degradation factor, which can be determined using historical data or may be defined as a percentage decrease from nominal. The slack variable may be bounded by zero at the low end.

In another example, a two-stage approach is used to limit performance degradation while also accounting for health degradation. In this example, a performance optimizing solution is determined in the first stage, and adjustments are made in a second stage to reduce health degradation with limited performance degradation. The nominal performance solution may be, for example and without intending limitation to MPC, using Equation 1. Here, any of formulas 2-4 may be operated after a nominal performance solution is achieved, while applying Equation 6 to limit performance degradation:

$$J_{HMPC} - J_{MPC,0} \leq \Delta J \quad [\text{Eq. 6}]$$

Where $\Delta J$ defines a maximum performance degradation that the health degradation optimization is allowed to impart. Thus, the updated solution of $J_{HMPC}$ is limited by a maximum degradation to the optimized solution.

Figure 7:
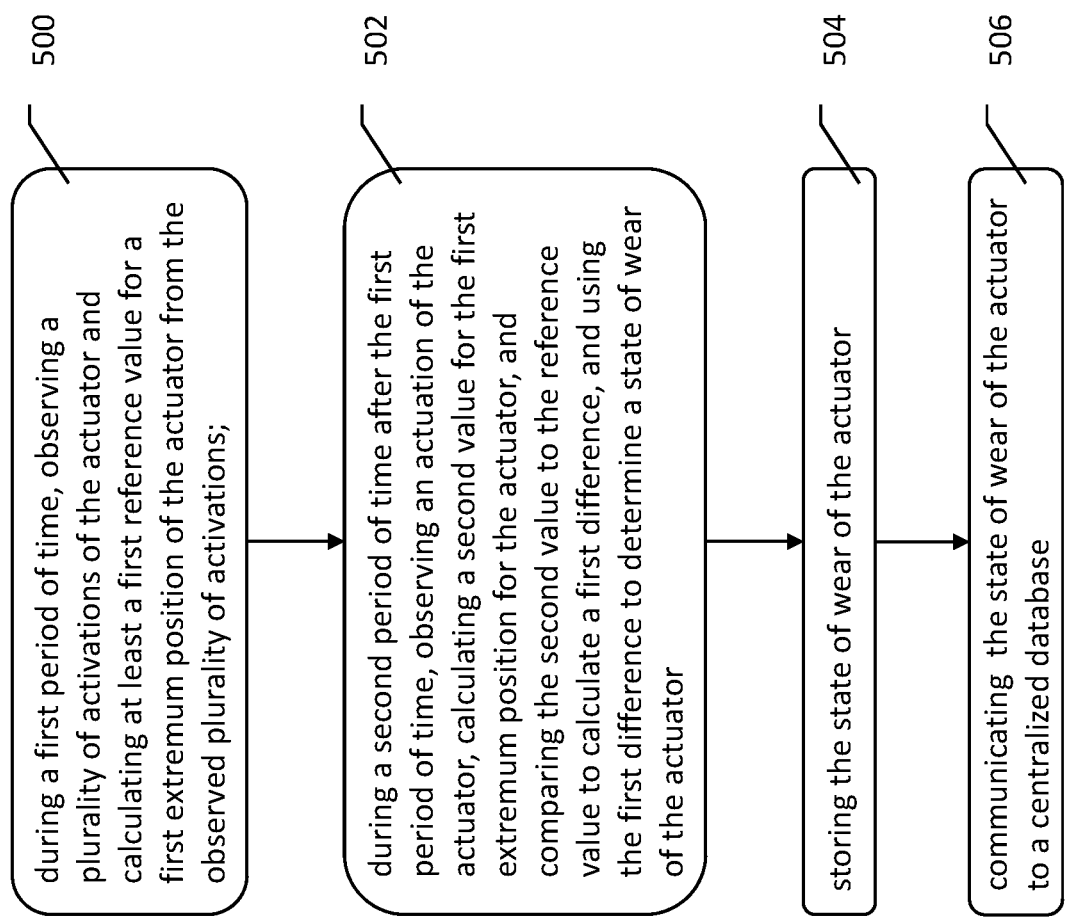

FIG. 7 shows an illustrative control method for monitoring an actuator. At block 500, the method includes, during a first period of time, observing a plurality of activations of the actuator and calculating at least a first reference value for a first extremum position of the actuator from the observed plurality of activations. At block 502, the method includes, during a second period of time after the first period of time, observing an actuation of the actuator, calculating a second value for the first extremum position for the actuator, and comparing the second value to the reference value to calculate a first difference, and using the first difference to determine a state of wear of the actuator. At block 504, the method includes storing the state of wear of the actuator. Optionally, at block 506, the method includes communicating the state of wear of the actuator to a centralized database.

Figure 8:
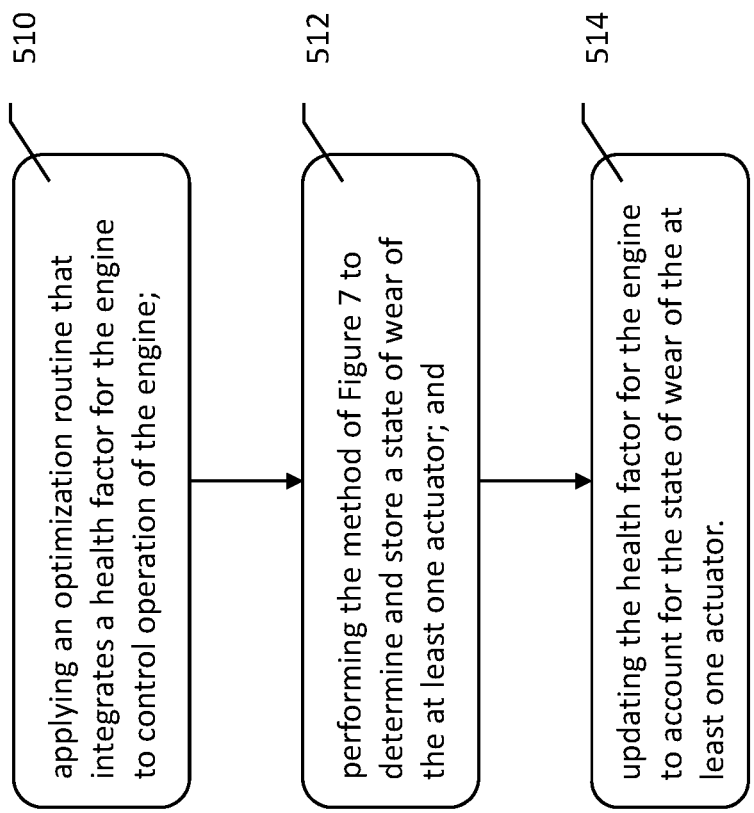

FIG. 8 shows an illustrative control method for controlling an engine system, the engine system having at least one actuator used in controlling operation of an engine. The method includes, at block 510, applying an optimization routine that integrates a health factor for the engine to control operation of the engine. At block 512, the method includes performing the method of FIG. 7 to determine and store a state of wear of the at least one actuator. At block 514, the method includes updating the health factor for the engine to account for the state of wear of the at least one actuator.

Figure 9:
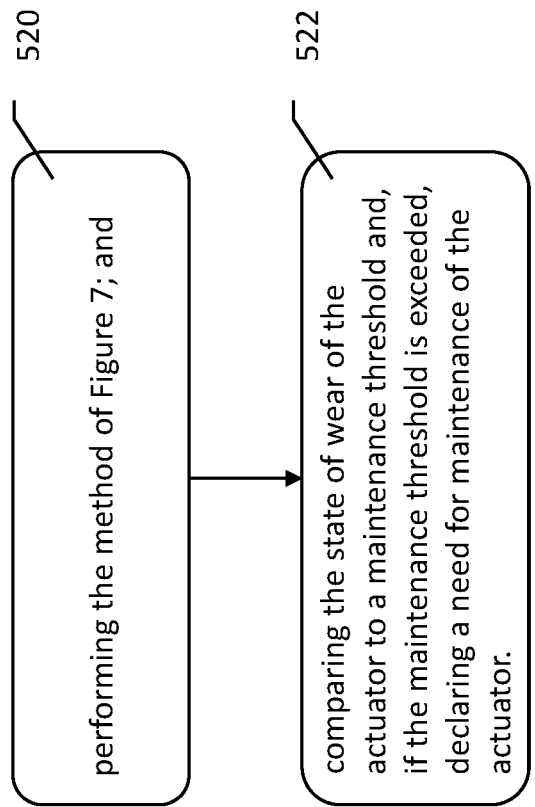

FIG. 9 shows an illustrative method for monitoring an actuator. At block 520, the method includes performing the method of FIG. 7. At block 522, the method includes comparing the state of wear of the actuator to a maintenance threshold and, if the maintenance threshold is exceeded, declaring a need for maintenance of the actuator.

FIG. 10 shows an illustrative method for monitoring an actuator. At block 530, the method includes performing the method of FIG. 7. At block 532, the method includes, during the second period of time, repeatedly determining a state of wear of the actuator. At block 534, the method includes determining a trend of the state of wear of the actuator. At block 536, the method includes calculating a time to maintenance of the actuator.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. A method of monitoring an actuator comprising:
    during a first period of time, observing a plurality of activations of the actuator and calculating at least a first reference value for a first extremum position of the actuator from the observed plurality of activations;
    during a second period of time after the first period of time, observing an actuation of the actuator, calculating a second value for the first extremum position for the actuator, and comparing the second value to the reference value to calculate a first difference, and using the first difference to determine a state of wear of the actuator; and storing the state of wear of the actuator.

2. A method of controlling an engine system, the engine system having at least one actuator used in controlling operation of an engine, the method comprising:
applying an optimization routine that integrates a health factor for the engine to control operation of the engine;
performing the method of claim 1 to determine and store a state of wear of the at least one actuator; and
updating the health factor for the engine to account for the state of wear of the at least one actuator.

3. The method of claim 2, wherein the engine has an intake manifold and an exhaust manifold, and the engine system includes an exhaust gas recirculation (EGR) valve placed and adapted to allow exhaust gas from the exhaust manifold to recirculate to the intake manifold, and the at least one actuator is controls the EGR valve.

4. The method of claim 2, wherein the engine comprises an intake manifold and an exhaust manifold, and the engine system includes:
a turbocharger having a compressor configured to compress air going to the intake manifold and a turbine configured to receive exhaust gas from the exhaust manifold and generate torque to drive the compressor; and
a wastegate (WG) placed and adapted to allow exhaust gas from the engine to bypass the turbine,
further wherein the at least one actuator controls the WG.

5. The method of claim 2, wherein the engine comprises an intake manifold, and the engine system includes:
a compressor configured to compress air going to the intake manifold; and
a recirculation valve (RCV) adapted to selectively recirculate compressed air at the intake manifold to a position upstream of the compressor;
further wherein the at least one actuator controls the RCV.

6. The method of claim 2, wherein the engine system comprises a throttle at least partly controlling air flow to the engine, further wherein the at least one actuator controls the throttle.

7. The method of claim 1, further comprising comparing the state of wear of the actuator to a maintenance threshold and, if the maintenance threshold is exceeded, declaring a need for maintenance of the actuator.

8. The method of claim 1, further comprising:
during the second period of time, repeatedly determining a state of wear of the actuator;
determining a trend of the state of wear of the actuator; and
calculating a time to maintenance of the actuator.

9. The method of claim 1, further comprising communicating the state of wear of the actuator to a centralized database.

10. A configurable controller for controlling a physical plant having associated therewith a plurality of actuators for controlling operation of the physical plant and a plurality of sensors for observing a plurality of characteristics of the physical plant operations, the configurable controller comprising:
a state observer configured to capture a current state of the physical plant by communication with the plurality of sensors; and
an optimizer configured to optimize behavior of the physical plant using at least the actuators;
wherein the state observer is configured to determine a state of wear of a selected one of the actuators by:
during a first period of time, observing a plurality of activations of the selected one of the actuators and calculating at least a first reference value for a first extremum position of the selected one of the actuators from the observed plurality of activations; and
during a second period of time after the first period of time, observing an actuation of the selected one of the actuators, calculating a second value for the first extremum position for the selected one of the actuators, and comparing the second value to the reference value to calculate a first difference, and using the first difference to determine a state of wear of the selected one of the actuators.

11. The configurable controller of claim 10, wherein the optimizer is operable using at least one first term associated with optimized performance of the physical plant based on the current state of the physical plant, and at least one second term associated with health degradation of one or more components of the physical plant, and the optimizer operates to direct use of parameters in the actuators to minimize the sum of the first and second terms, wherein the state of wear of the selected one of the actuators is incorporated into the at least one second term.

12. A configurable controller for controlling an engine system including an engine having an intake manifold and an exhaust manifold, the engine system having associated therewith at least one actuator for controlling operation of a component of the engine system and a sensor for sensing position of the at least one actuator, the configurable controller comprising:
a state observer configured to capture a current state of the engine system by communication with at least the sensor; and
an optimizer configured to optimize behavior of the engine system using the at least one actuator;
wherein the state observer is configured to determine a state of wear of the at least one actuator by:
during a first period of time, observing a plurality of activations of the at least one actuator and calculating at least a first reference value for a first extremum position of the at least one actuator from the observed plurality of activations; and
during a second period of time after the first period of time, observing an actuation of the at least one actuator, calculating a second value for the first extremum position for the at least one actuator, comparing the second value to the reference value to calculate a first difference, and using the first difference to determine a state of wear of the at least one actuator.

13. The configurable controller of claim 12, wherein the optimizer is configured to:
incorporate the state of wear of the at least one actuator into an optimization routine that identifies control parameters for operation of the engine;
perform the optimization routine to generate a control solution; and
issue control signals to the engine system, including the at least one actuator, to implement the control solution.

14. The configurable controller of claim 12, further configured to:

record the state of wear of the at least one actuator during the second period of time a plurality of times in response to a plurality of iterations;

extrapolate a future state of wear of the at least one actuator; and determine a time to maintenance for the at least one actuator.

15. The configurable controller of claim 12, further configured to:

compare the state of wear of the at least one actuator during the second period of time to a wear threshold; and if the wear threshold is met by the state of wear of the at least one actuator, generate an alert calling for maintenance of the at least one actuator.

16. The configurable controller of claim 12, further configured to communicate the state of wear of the at least one actuator to a centralized database.

17. The configurable controller of claim 12, wherein the engine system includes an exhaust gas recirculation (EGR) valve placed and adapted to allow exhaust gas from the exhaust manifold to recirculate to the intake manifold, and the at least one actuator is configured to control the EGR valve.

18. The configurable controller of claim 12, wherein the engine system includes:

a turbocharger having a compressor configured to compress air going to the intake manifold and a turbine configured to receive exhaust gas from the exhaust manifold and generate torque to drive the compressor; and a wastegate (WG) placed and adapted to allow exhaust gas from the engine to bypass the turbine, further wherein the at least one actuator is configured to control the WG.

19. The configurable controller of claim 12, wherein the engine system includes:

a compressor configured to compress air going to the intake manifold; and a recirculation valve (RCV) adapted to selectively recirculate compressed air at the intake manifold to a position upstream of the compressor;

further wherein the at least one actuator is configured to control the RCV.

20. The configurable controller of claim 12, wherein the engine system comprises a throttle at least partly controlling air flow to the intake manifold, further wherein the at least one actuator is configured to control the throttle.

* * * * *